United States Patent
Matsumoto et al.

(10) Patent No.: US 7,588,294 B2
(45) Date of Patent: Sep. 15, 2009

(54) SEAT RECLINING DEVICE FOR VEHICLE

(75) Inventors: Tadashi Matsumoto, Shizuoka (JP); Tetsuya Ohba, Shizuoka (JP)

(73) Assignee: Fuji Kiko Co., Ltd., Kosai-shi (JP)

( * ) Notice: Subject to any disclaimer, the term of this patent is extended or adjusted under 35 U.S.C. 154(b) by 0 days.

(21) Appl. No.: 11/979,155

(22) Filed: Oct. 31, 2007

(65) Prior Publication Data
US 2008/0122282 A1   May 29, 2008

(30) Foreign Application Priority Data
Nov. 28, 2006 (JP) .............................. 2006-319448
Feb. 23, 2007 (JP) .............................. 2007-043101

(51) Int. Cl.
*B60N 2/02* (2006.01)
(52) U.S. Cl. ....................... 297/367; 297/366
(58) Field of Classification Search ................. 297/366, 297/367
See application file for complete search history.

(56) References Cited

U.S. PATENT DOCUMENTS

| | | | |
|---|---|---|---|
| 6,666,515 B2 * | 12/2003 | Asano et al. ............... | 297/366 |
| 7,100,987 B2 * | 9/2006 | Volker et al. ................ | 297/367 |
| 7,261,379 B2 * | 8/2007 | Volker et al. ................ | 297/367 |
| 2002/0096925 A1 * | 7/2002 | Uramichi ..................... | 297/367 |
| 2004/0036337 A1 | 2/2004 | Hoshihara et al. | |

FOREIGN PATENT DOCUMENTS

| EP | 1 700 738 A1 | 9/2006 |
|---|---|---|
| JP | 2004-016651 A | 1/2004 |

* cited by examiner

Primary Examiner—Laurie K Cranmer
(74) Attorney, Agent, or Firm—Foley & Lardner LLP

(57) ABSTRACT

A seat reclining device includes a base member formed with a shaft hole; a rotating member including an internal gear; at least three lock members each including an external gear; a shaft portion formed integrally with the base member and including a convex guiding surface for swinging the lock member along a circular orbit; a cam provided with an axially projecting portion passing through the shaft hole; and at least three guide projections formed integrally with the base member. The axially projecting portion includes a centering outer peripheral surface which is slidably in contact with an inner peripheral surface of the shaft hole. The guide projections and the lock members are located alternately in the circumferential direction. Each of the guide projections includes a centering inner peripheral surface provided at inner peripheral side of the guide projection and adapted to slide on an outer peripheral surface of the cam to perform a centering of the cam; and a pair of concave guiding surfaces respectively guiding the adjacent two lock members so as to swing the adjacent two lock members along the circular orbits.

4 Claims, 8 Drawing Sheets

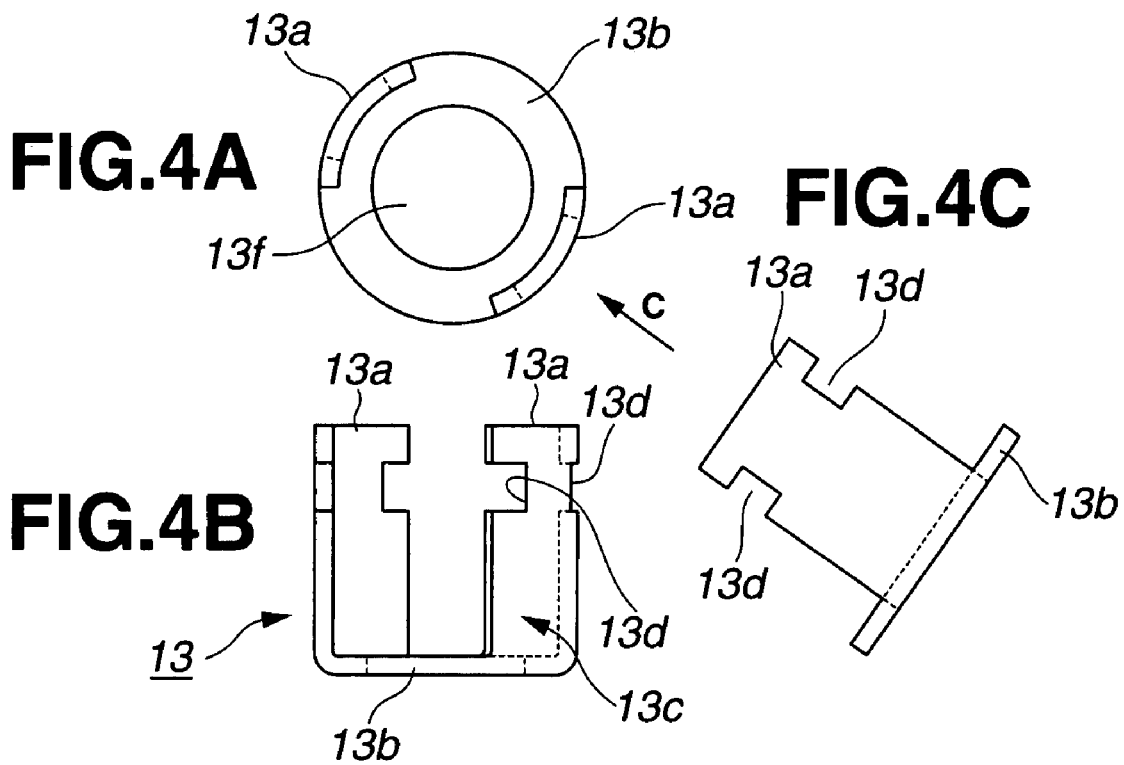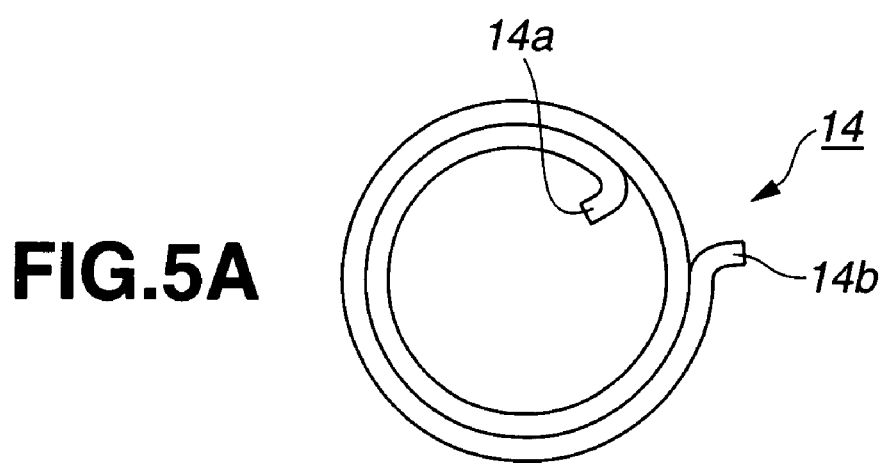

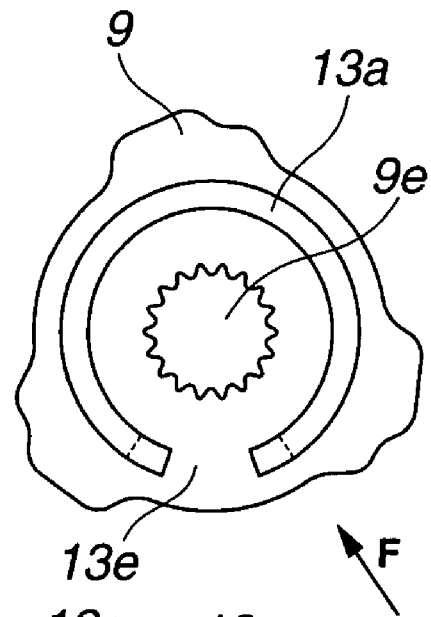
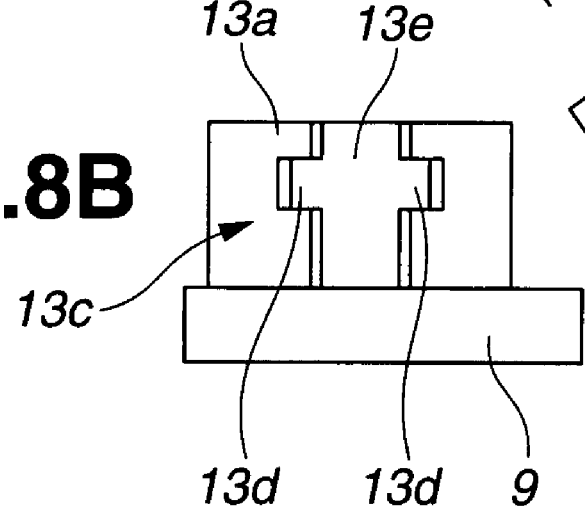
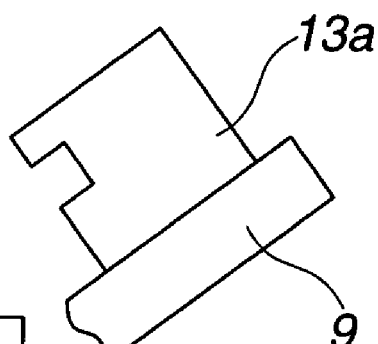

SEAT RECLINING DEVICE FOR VEHICLE

BACKGROUND OF THE INVENTION

The present invention relates to a seat reclining device for a vehicle, adapted to adjustably fix an angle of a seat back relative to a seat cushion.

As a vehicle seat reclining device, there is a device which is constituted by a body frame mounted to a base plate on a seat-cushion side and a cover member mounted to an arm plate on a seat back side, and which is arranged to limit a relative rotation between the body frame and the cover member and to maintain a desired angular position of the seat back by engaging an external gear of a lock tooth attached to the body frame with an internal gear formed in an inner peripheral surface of the cover member.

In order to fix the lock tooth, the body frame is formed with a shaft portion and a pair of guide projections in the vicinity of the internal gear. The lock tooth has a concave bearing surface which is guided by a convex guiding surface of the shaft portion, and a sliding surface which is slidably in contact with a concave guiding surface of the guide projection. Moreover, a cam for pressing the lock tooth to the outer side so as to engage the external gear with the internal gear is provided at a rotational-center portion of the internal gear.

In thus-arranged seat reclining device, at the time of vehicle rear collision, the lock tooth receives an external force of rotating the seat back in the backward direction through the engagement between the internal gear and the external gear. At this moment, since the lock tooth is supported by the shaft portion and one of the pair of guide projections, the rotation of the cover member relative to the body frame is limited, and therefore the seat back is not rotated from a predetermined angular position.

Although a belt anchor for supporting a force applied to an upper portion of seat belt is conventionally provided at a center pillar of a vehicle body, there has been lately increased a type that the belt anchor is provided at the seat back. Therefore, in the case of the belt anchor provided at the seat back; an inertia force due to a weight of a vehicle occupant during vehicle collision is transmitted to the seat back through the seat belt, and hence a force greater than that of a type that the belt anchor is provided at the center pillar is applied to the seat back in the forward direction. Accordingly, the vehicle seat reclining device of the type that the belt anchor is provided at the seat back is lately requested to be durable to a further large load.

Japanese Patent Application Publication No. 2004-16651 discloses a previously-proposed seat reclining device for vehicle. In this technique, three pawls disposed at circumferentially even intervals are guided so as to be radially movable along respective guide grooves of a lower arm. Two parallel surfaces of a rotating shaft are loosely fitted into a center hole of a cam, and three projections provided to the cam at circumferentially even intervals are loosely fitted into corresponding cam holes of the three pawls. When rotating the rotating shaft; each pawl moves in a radially outward direction, and an outer gear of each pawl is engaged with an inner gear of an upper arm so that the upper arm is locked relative to the lower arm.

SUMMARY OF THE INVENTION

However in the technique disclosed in the above Japanese Patent Application, there is a play between the rotating shaft and the cam since the two parallel surfaces of the rotating shaft are loosely fitted into the center hole of the cam. Accordingly, when rotating the rotating shaft in order to unlock the seat back, a rotation of the cam is delayed as compared to the rotation of the rotating shaft so that a manipulation feeling of vehicle occupant becomes uncomfortable. Moreover, since the cam and the rotating shaft are not supported by the lower arm, an eccentricity and an inclination of rotational center of the rotating shaft are caused during the unlocked state of upper arm. This results in the uncomfortable feeling of the vehicle occupant. Namely, when unlocking the upper arm; the cam becomes to be not-supported also by the pawls so that a rotational axis of the cam is not fixed, and the rotating shaft is supported only within the range of length of axial thickness of the upper arm. This causes the eccentricity and the inclination of rotational center to the rotating shaft by way of a force of a spring provided for biasing the cam and by way of a manipulating force of an operation handle. Specifically, such a problem becomes increasingly prominent in the case where the seat reclining device is mounted at only one side of left and right sides of the vehicle seat or in the case where the seat reclining devices mounted at both sides of left and right sides of the vehicle seat are connected with each other through a cable or the like.

It is an object of the present invention to provide a vehicle seat reclining device devised to solve or ease the above-mentioned problem.

According to one aspect of the present invention, there is provided a seat reclining device for a vehicle, comprising: a base member connected with either one of a seat cushion and a seat back arranged rotatably to the seat cushion, the base member being formed with a shaft hole; a rotating member connected with another of the seat cushion and the seat back and arranged circumferentially rotatably to the base member, the rotating member including an internal gear in an inner peripheral surface of the rotating member; at least three lock members each including an external gear adapted to engage with the internal gear, each of the at least three lock members being adapted to swing in a direction in which the external gear engages with or disengages from the internal gear; a shaft portion formed integrally with the base member, the shaft portion including a convex guiding surface for swinging the lock member along a circular orbit; a cam adapted to lock and unlock the rotating member by pressing the lock member and thereby engaging or disengaging the external gear with/from the internal gear, the cam being provided with an axially projecting portion projecting in an axial direction of the cam and passing through the shaft hole, the axially projecting portion including a centering outer peripheral surface which is slidably in contact with an inner peripheral surface of the shaft hole; a center shaft press-fitted into the cam to pass through the cam, and adapted to rotate the cam, the center shaft passing through the shaft hole; a biasing member disposed so as to surround the center shaft and biasing the cam in a direction for locking the rotating member, the biasing member including an inner end portion connected with a tip portion of the axially projecting portion and an outer end portion connected with the base member; an operating lever attached to the center shaft; and at least three guide projections formed integrally with the base member, the at least three guide projections and the at least three lock members being disposed alternately in a circumferential direction relative to a rotation axis of the cam, each of the at least three guide projections including a centering inner peripheral surface provided at inner peripheral side of the each of the at least three guide projections relative to the rotation axis, and adapted to slide on an outer peripheral surface of the cam to perform a centering of the cam and a pair of concave guiding surfaces respectively guiding the adjacent two lock members so as to swing the adjacent two lock members along the circular orbits.

The other objects and features of this invention will become understood from the following description with reference to the accompanying drawings.

BRIEF DESCRIPTION OF DRAWINGS

FIG. 4A is a plan view of an axially projecting member according to the first embodiment. FIG. 4B is a front view of the axially projecting member. FIG. 4C is a view when viewing FIG. 4A in a direction shown by arrow C.

FIG. 5A is a plan view of a lock spring according to the first embodiment. FIG. 5B is a front view of the lock spring.

FIG. 8A is a plan view of a cam according to the second embodiment. FIG. 8B is a front view of the cam. FIG. 8C is a view when viewing FIG. 8A in a direction shown by arrow F.

DETAILED DESCRIPTION OF THE INVENTION

Reference will hereinafter be made to the drawings in order to facilitate a better understanding of the present invention. Embodiments of seat reclining device for a vehicle according to the present invention will be explained below.

First Embodiment

Figure 10:
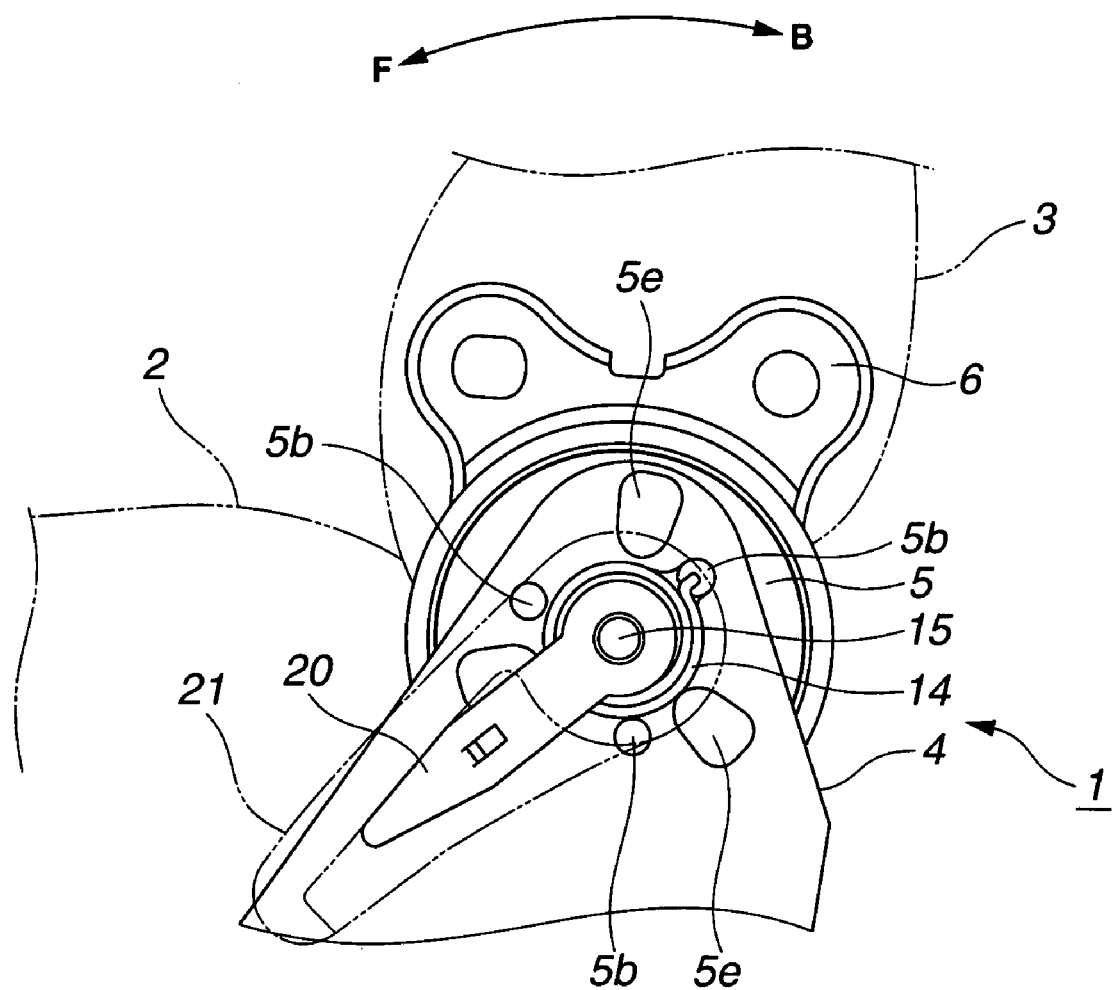
FIG. 10 is a structural view of a seat for vehicle according to respective embodiments.

At first, a first embodiment according to the present invention will now be explained. As shown in FIG. 10, there are provided a seat cushion 2 functioning as a portion upon which a vehicle occupant sits, and a seat back 3 attached to seat cushion 2 rotatably in a front direction F and a backward direction B of vehicle. Seat cushion 2 is connected through a base plate 4 with a body frame (or machine casing) 5. Seat back 3 is connected through an arm plate 6 with a cover member (cover body) 7 which is not shown in FIG. 10. Further, there is provided a spring (not shown) functioning to urge or bias seat back 3 to recline (tilt) in front direction F of vehicle with respect to seat cushion 2.

Figure 1B:
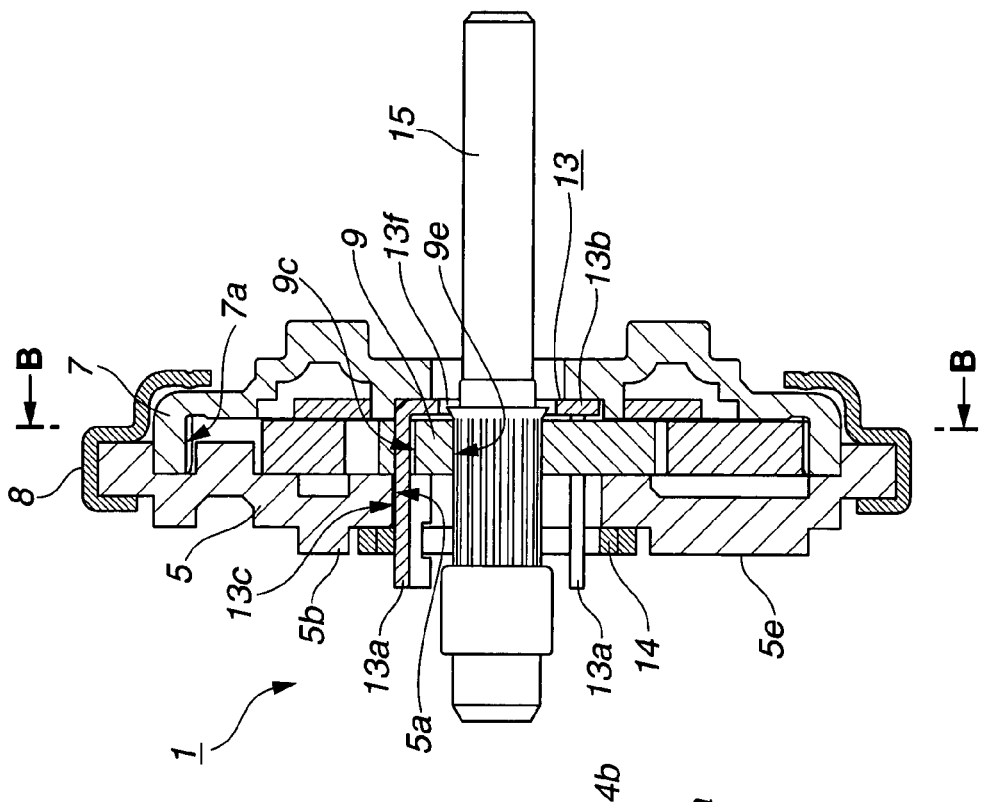
FIG. 1B is a sectional view of FIG. 1A as viewed in a direction shown by arrows A.
Figure 1A:
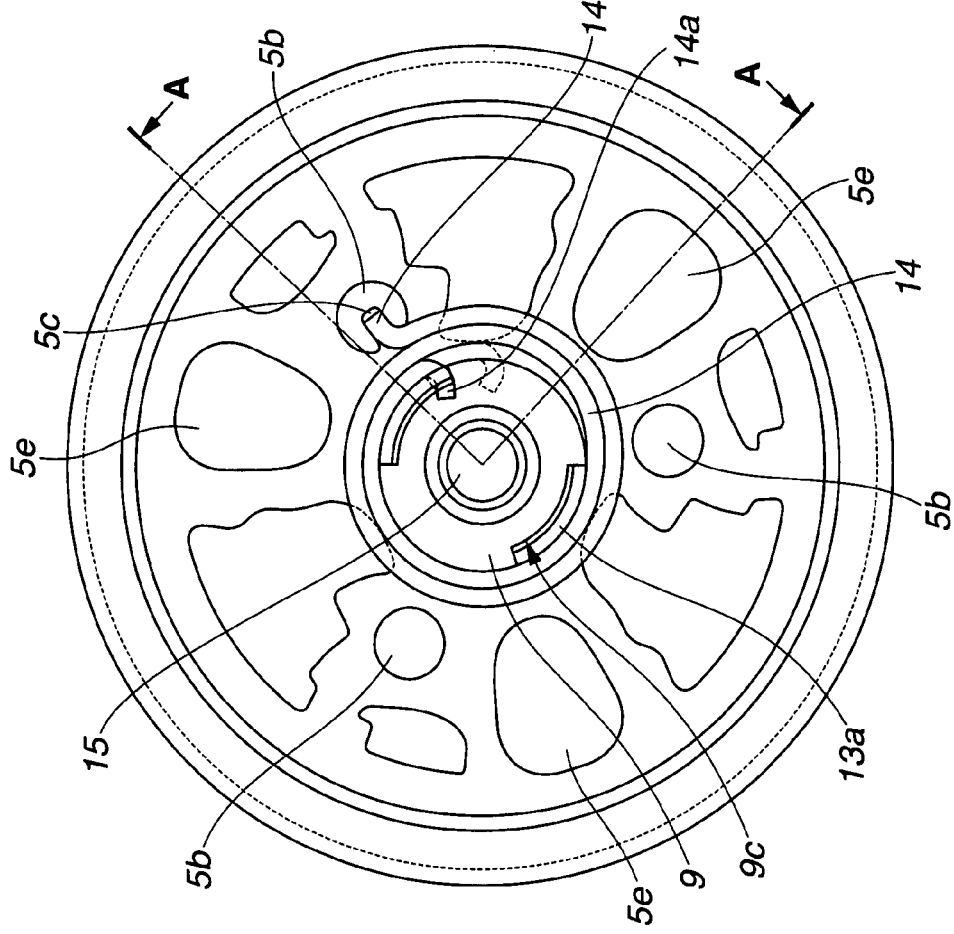
FIG. 1A is a front view of a seat reclining device for vehicle according to a first embodiment of the present invention.
Figure 2:
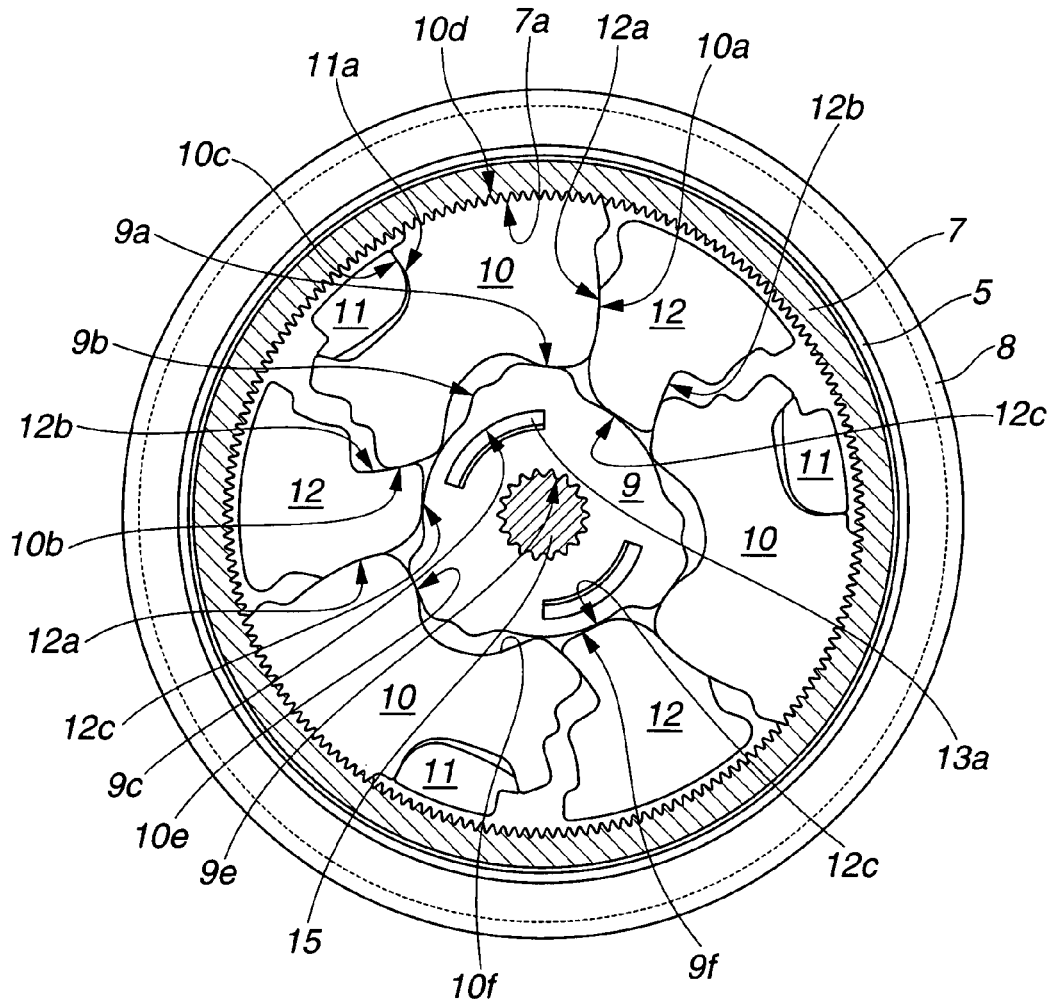
FIG. 2 is a sectional view of FIG. 1B as viewed in a direction shown by arrows B in the first embodiment.

As shown in FIGS. 1A and 1B, a seat reclining device 1 for a vehicle includes body frame 5 (hereinafter also referred to as "base member") and cover member 7 (hereinafter also referred to as "rotating member"). The structure of seat reclining device 1 will be now explained. As shown in FIGS. 1A and 1B, body frame 5 includes a circular depressed portion formed by pressing a radially inner portion of a disc by means of half die cutting (half blanking). Cover member 7 includes a circular depressed portion formed by casting a radially outer portion of a disc in a shape of flange. In an inner peripheral surface of this circular depressed portion, there is provided an internal gear 7a. Namely, internal gear 7a is formed in the radially inner surface of the flange portion of circular depressed portion of cover member 7. Cover member 7 is fit into the circular depressed portion of body frame 5 coaxially and rotatably relative to body frame 5. Namely, the flange portion of cover member 7 is inserted radially inside a flange of the circular depressed portion of body frame 5, so as to enable cover member 7 to rotate coaxially with respect to body frame 5. As shown in FIG. 1B, a holder 8 holds or supports peripheral portions (i.e., radially-outer surfaces) of body frame 5 and cover member 7 by sandwiching the peripheral portions of body frame 5 and cover member 7, so as to allow cover member 7 to rotate with respect to body frame 5. Holder 8 is formed in the shape of ring that can surround the peripheral portions of body frame 5 and cover member 7. Axially between body frame 5 and cover member 7, a rotatable cam 9 (cam of rotating type) is disposed at a radially-central position. In positions which are radially surrounding cam 9 and are located axially between body frame 5 and cover member 7, three lock tooth's 10 (meshing members, hereinafter also referred to as "lock members") are disposed substantially at circumferentially even intervals, as shown in FIG. 2. Each of three lock tooth's 10 is arranged swingably.

In order to swingably guide each lock tooth 10 along a circular orbit (arc orbit), a semi(half)-column-shaped shaft portion 11 having a convex guiding surface 11a is integrally formed with body frame 5, within an inner side of the circular orbit. On the other hand, lock tooth 10 has a bearing surface 10c formed by cutting a part of lock tooth 10 into a half-round shape. Further, in order to swingably guide lock tooth 10 along the circular orbit; three guide projections (three guide portions) 12 are integrally formed with body frame 5 to project in the axial direction of an after-mentioned center shaft 15. Each of three guide projections 12 are provided between two lock tooth's 10 adjacent in the circumferential direction about a rotational center of cover member 7. Three guide projections 12 are formed in the same shape as one another. First and second concave guiding surfaces 12a and 12b are formed on each guide projection 12, so as to guide lock tooth 10. Namely, each guide projection 12 includes first and second concave guiding surfaces 12a and 12b at an outer peripheral side of the circular orbit for the swing of lock tooth 10. Each lock tooth 10 includes first and second sliding outer-peripheral surfaces 10a and 10b which respectively slide on first and second concave guiding surfaces 12a and 12b. An external gear 10d which is capable of engaging with internal gear 7a is formed in a surface of each lock tooth 10 facing to internal gear 7a.

In order to push lock tooth 10, which has external gear 10d for engaging and disengaging with internal gear 7a, toward internal gear 7a; cam 9 is provided. Namely, cam 9 is adapted to press external gear 10d of lock tooth 10 toward internal gear 7a so as to engage external gear 10d with internal gear 7a, and so as to conversely release this engagement between external gear 10d and internal gear 7a. Cam 9 has a locking cam surface 9a and a lock-releasing cam surface 9b for one lock tooth 101 namely has three sets of locking cam surface 9a and lock-releasing cam surface 9b. Locking cam surface 9a functions to swing lock tooth 10 about shaft portion 11 in the anticlockwise direction of FIG. 2 and to engage external gear 10d with internal gear 7a, according to the clockwise directional rotation of cam 9 and the fitting (engagement) between locking cam surface 9a and a locking surface 10e of lock tooth 10. Lock-releasing cam surface 9b functions to swing lock tooth 10 about shaft portion 11 in the clockwise direction and to disengage or pull external gear 10d from internal gear 7a, according to the anticlockwise directional rotation of cam 9 and the fitting (engagement) between lock-releasing cam surface 9b and a lock-releasing surface 10f of lock tooth 10. Locking surface 10e and lock-releasing surface 10f are provided at the inner peripheral side of lock tooth 10 relative to the rotational center of cover member 7. By engaging external gear 10d with internal gear 7a, the rotation of cover member 7 relative to body frame 5 is restricted and is put in a lock state, and seat back 3 is held at a predetermined angular position relative to seat cushion 2.

At inner peripheral side of each of three guide projections 12, guide projection 12 includes a cam-centering inner peripheral surface 12c which functions to perform a centering of cam 9 (i.e., an adjustment of rotational center or position of cam 9) by sliding on an arc-shaped outer peripheral surface 9f of cam 9. Namely, each cam-centering inner peripheral surface 12c rotatably holds cam 9 by supporting the outer peripheral portion of cam 9. A slight clearance (space) is provided between outer peripheral surface 9f and cam-centering inner peripheral surface 12c, so as to stabilize the engagements (mesh) of three lock tooth's 10. The rotational center of cam 9 can be adjusted or aligned only within the range of this slight clearance.

Figure 3A:
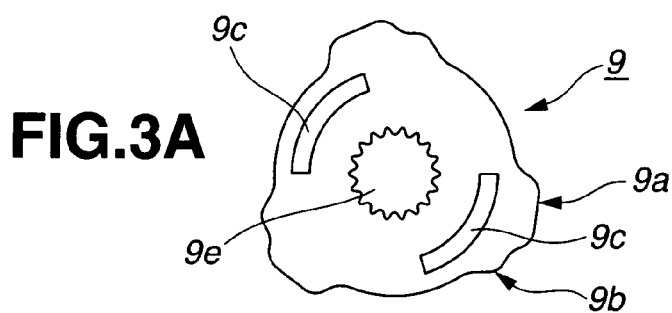
FIG. 3A is a plan view of a cam according to the first embodiment.
Figure 3B:
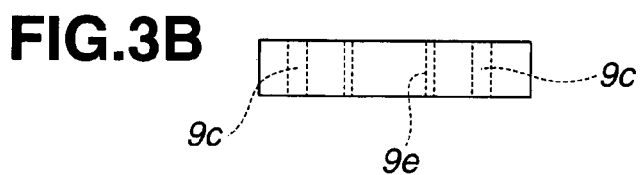
FIG. 3B is a front view of the cam.

An axially projecting portion 13a projecting in the axial direction of cam 9 is provided with cam 9. Namely in the first embodiment, as shown in FIGS. 4A to 4C, two axially projecting portions 13a, each of which is formed in an arc-shape in cross section perpendicular to the rotational axis of cam 9, are provided to cam 9 substantially at circumferentially even intervals. Base end portions of respective axially projecting portions 13a are formed integrally with a linking portion 13b to constitute an axially projecting member 13. Linking portion 13b is formed in a shape of ring, namely is formed with a hole 13f through which center shaft 15 is inserted. As shown in FIGS. 3A and 3B, cam 9 is formed with two arc-shaped holes 9c corresponding to the two axially projecting portions 13a. Each axially projecting portion 13a is inserted into arc-shaped hole 9c, and a part of axially projecting portion 13a is connected with cam 9 at arc-shaped hole 9c by press fitting. As shown in FIG. 2, each axially projecting portion 13a is press-fitted into arc-shaped hole 9c only in the circumferential direction, namely is loosely fitted into this arc-shaped hole 9c in the radial direction. As shown in FIG. 1B, body frame 5 has a shaft hole 5a through which center shaft 15 is passed. Axially projecting portions 13a are also passed through shaft hole 5a from one side to another side of body frame 5. Each axially projecting portion 13a has a centering outer peripheral surface 13c functioning to perform a centering (i.e., adjustment of rotational center) of axially projecting portions 13a. This centering outer peripheral surface 13c is in arc shape (in cross section), and is adapted to slide on an arc-shaped inner peripheral surface of shaft hole 5a. A slight clearance is provided between the inner peripheral surface of shaft hole 5a and centering outer peripheral surface 13c, so as to stabilize the engagements (mesh) of three lock tooth's 10. The rotational centers (axes) of cam 9 and axially projecting portions 13a can be adjusted or aligned only within the range of this slight clearance.

As shown in FIGS. 5A and 5B, a lock spring 14 is provided so as to surround center shaft 15, as a biasing member or biasing means for locking the seat reclining device 1. Lock spring 14 always biases cam 9 in the clockwise direction so as to mesh external gear 10d of lock tooth 10 with internal gear 7a. An inner end portion 14a of lock spring 14 which has been bent or inflected is engaged with a notch portion (spring hanging portion) 13d provided at a tip portion of axially projecting portion 13a. On the other hand, an outer end portion 14b of lock spring 14 which has been bent is engaged with a groove (recess) 5c of a circular projecting portion 5b of body frame 5. Circular projecting portion 5b projects in the axial direction from a base plate portion (i.e., from the above-mentioned circular depressed portion) of body frame 5. Lock spring 14 is a spiral spring wound substantially two times (2 turns) or may be a spiral spring wound substantially three times. Inner end portion 14a is shaped to be bent in the inwardly radial direction from in the circumferential direction (relative to the rotation of cover member 7, cam 9, or the like), and outer end portion 14b is shaped to be bent outwardly in the radial direction. Under the assembled state, a radially-inner surface of outer wire of the spiral lock spring 14 (relative to the rotation of cover member 7 or the like) is in contact with a radially-outer surface of inner wire of lock spring 14 to slide on each other.

Center shaft 15 is combined or connected with cam 9 by means of press fitting at a center hole 9e of cam 9, namely is press-fitted into center hole 9e of cam 9 through a serration structure. Center shaft 15 functions to rotate cam 9 against the biasing force of lock spring 14.

As shown in FIG. 1A, three outward projections 5e are formed integrally with body frame 5 at substantially even intervals in the circumferential direction of body frame 5. Each of three outward projections 5e is not shaped circularly, and is formed largely as compared with circular projecting portion 5b, so as to axially project (from the base plate portion of body frame 5) on the side of body frame 5 opposite to shaft portion 11 and guide projection 12. As shown in FIG. 10, respective three outward projections 5e and circular projecting portions 5b are fitted into holes formed in base plate 4, and peripheral portions of only outward projections 5e are connected with (inner surfaces of the holes of) base plate 4 by welding.

Two seat reclining devices 1 are disposed respectively at both sides of seat cushion 2 in the width direction of seat cushion 2 (lateral direction of vehicle). Two center shafts 15 provided separately in these right and left seat reclining devices 1 are connected with each other through a tubular shaft (not shown) which has undergone serration treatment. Namely, laterally inner end portions of two center shafts 15 are connected with each other by using the tubular shaft by means of serration coupling. An operating lever 20 is attached to a laterally outer end portion of one of these two center shafts 15, as shown in FIG. 10.

Next, operations of seat reclining device 1 for vehicle will be now explained.

Under the condition that seat reclining device 1 is attached to the seat, in normal time; the biasing (urging) force of lock spring 14 is transmitted through axially projecting portions 13a to cam 9 so that cam 9 is maintained in the state where cam 9 has been rotated in the clockwise direction, as shown in FIG. 2. Accordingly, each locking cam surface 9a of cam 9 presses locking surface 10e of lock tooth 10, and each lock tooth 10 is guided by shaft portion 11 and adjacent two guide projections 12 so that lock tooth 10 is in the state where lock tooth 10 has swung in the anticlockwise direction around shaft portion 11. Accordingly, lock tooth 10 is in the state that external gear 10d is engaged with internal gear 7a of cover member 7. That is, cover member 7 and seat back 3 are put in the lock state, and therefore the swinging of seat back 3 is restricted (made impossible).

Subsequently, by rotating center shaft 15 in the clockwise direction in FIG. 10 against the biasing force of lock spring 14 through the manipulation of operating lever 20, cam 9 is made to rotate in the anticlockwise direction in FIG. 2. Accordingly, the connection (engagement) between locking cam surface 9a of cam 9 and locking surface 10e of lock tooth 10 is released, and lock-releasing cam surface 9b pushes lock-releasing surface 10f of lock tooth 10 in the clockwise direction around shaft portion 11 in FIG. 2. Therefore, each lock tooth 10 swings in the clockwise direction about shaft portion 11. The engagement between external gear 10d and internal gear 7a is cancelled. Thereby, seat back 3 (and thus seat reclining device 1) is put in the lock-released state, and arm plate 6 and seat back 3 which are attached to cover member 7 are rotated in forward direction F in FIG. 10 because of a biasing force of the not-shown spring.

By rotating seat back 3 in backward direction B against biasing force of the not-shown spring and by releasing a hand of seat occupant from operating lever 20 when seat back 3 is positioned at a desired angular position; cam 9 rotates in the clockwise direction of FIG. 2 due to the biasing force of lock spring 14, and each locking cam surface 9a pushes the corresponding locking surface 10e of lock tooth 10 so that lock tooth 10 rotates in the anticlockwise direction about shaft portion 11. Therefore, external gear 10d of lock tooth 10 is engaged with internal gear 7a, and seat reclining device 1 returns to the lock state.

Subsequently, there is discussed a manner of operation under the situation that an inertia force of vehicle occupant is applied to seat back 3 through a seat belt due to a vehicular front collision so that an external force directed to forward direction F of FIG. 10 is applied to seat back 3. In this case, cover member 7 tends to rotate in the clockwise direction relative to body frame 5 in FIG. 2 (in the anticlockwise direction in FIG. 10), and the rotational force of cover member 7 is transmitted to lock tooth 10 through the engaging portion between internal gear 7a and external gear 10d. Therefore, each lock tooth 10 tends to rotate in the clockwise direction around shaft portion 11 in FIG. 2. At this moment, lock tooth 10 is supported by locking cam surface 9a of cam 9, convex guiding surface 11a of shaft portion 11, and second concave guiding surface 12b of guide projection 12.

Subsequently, there is discussed a manner of operation under the situation that a vehicle occupant is pressed to seat back 3 due to a rear side collision of vehicle so that an external force directed to rearward direction B in FIG. 10 is applied to seat back 3. In this case, cover member 7 and lock tooth 10 tend to rotate in the anticlockwise direction relative to body frame 5 in FIG. 2 (in the clockwise direction in FIG. 10). At this moment, lock tooth 10 is supported by locking cam surface 9a of cam 9, convex guiding surface 11a of shaft portion 11, and first concave guiding surface 12a of guide projection 12. Since three lock tooth's 10 and three guide projections 12 are alternately disposed at circumferentially even intervals in seat reclining device 1 of this embodiment; each guide projection 12 can be relatively enlarged to enhance a power for supporting lock tooth 10 (i.e., to enhance a bearing capacity for lock tooth 10). Therefore, even if the external force is added to seat back 3 in either of forward direction F and backward direction B; the attitude of each lock tooth 10 can be stabilized, and seat reclining device 1 has high resistance to the external force. Accordingly, the strength of seat reclining device 1 can be stabilized and enhanced.

According to the structure of first embodiment, each of lock spring 14 and operating lever 20 is offset or shifted relative to cam 9 in a direction perpendicular to the rotation axis of center shaft 15, cam 9, or the like. Accordingly, the biasing force of lock spring 14 is applied not only in the rotational direction of cam 9 but also in a direction in which cam 9 tilts (a direction in which cam 9 inclines relative to the original rotational center thereof, i.e., a direction in which a deviation of rotation axis occurs). Moreover, when manipulating operating lever 20, this manipulating force is applied not only in the rotational direction of center shaft 15 but also in a direction in which center shaft 15 tilts (a direction in which center shaft 15 inclines relative to the original rotational center thereof). However in this embodiment, center shaft 15 is integrated with cam 9 and axially projecting member 13 by means of press-fit connection. Moreover, the centering of cam 9 is performed under the condition where cam 9 is surrounded by three cam-centering inner peripheral surfaces 12c abutting on the partly-cylindrical outer peripheral surfaces 9f of cam 9, and the centering of axially projecting portions 13a is performed by outer peripheral surfaces 13c and the inner peripheral surface of shaft hole 5a. Therefore, it can be mentioned that the centerings of cam 9, axially projecting member 13, and center shaft 15 (which are integrated with one another) are conducted by using the range of sum length of an axial thickness of cam 9 and an axial thickness of body frame 5. Hence, eccentricity (rotational-center shift) and inclination of rotational center in each of cam 9 and center shaft 15 are prevented or restricted. Accordingly, the manipulation feeling can be prevented from deteriorating due to the eccentricity or inclination of rotational axis of cam 9 or center shaft 15 provided with operating lever 20. Further, the manipulating force for manipulating operating lever 20 can be lightened and stabilized.

Since the centering of cam 9 is conducted or adjusted under the condition where cam 9 is surrounded by three cam-centering inner peripheral surfaces 12c of guide projections 12 disposed at three positions circumferentially apart from one another by 120-degree angle (120°); the eccentricity of cam 9 is caused only in the slight range (clearance) provided for stabilizing the engagement of each lock tooth 10, even during the unlocked state of cover member 7. Moreover, centering outer peripheral surfaces 13c of axially projecting portions 13a cooperate with cam-centering inner peripheral surfaces 12c to suppress the inclinations of cam 9 and center shaft 15. Therefore, it is unnecessary to provide an additional bearing member, so that an axial thickness of seat reclining device 1 can be reduced.

Since lock spring 14 is arranged to allow the radially-inner surface of outer wire of spiral lock spring 14 to be slidably in contact with the radially-outer surface of inner wire of spiral lock spring 14 under the assembled state, it is suppressed that the respective bent inner end portion 14a and outer end portion 14b move in departing directions (radially inner direction and radially outer direction). Thereby, lock spring 14 is not disengaged even if a hanging width (overlap allowance) of engagement portion for lock spring 14 is reduced. Accordingly, lock spring 14 can be compactly arranged.

Since the centering of cam 9 is performed under the condition where cam 9 is surrounded by three cam-centering inner peripheral surfaces 12c, and lock spring 14 is provided between circular projecting portion 5b of body frame 5 and notch portion 13d of axially projecting portion 13a connected integrally with cam 9; it is unnecessary to perform the centering treatment of center shaft 15 against body frame 5 or cover member 7. Accordingly, under the situation where centering shaft 15 has not yet been attached to seat reclining device 1, the lock function and the unlock function of seat reclining device 1 can be established. Therefore, seat reclining device 1 to which center shaft 15 has not yet been connected by press fitting can guarantee the performance same as the state where the centering of center shaft 15 has been completed. Even in the case where center shaft 15 and seat reclining device 1 that has not yet been press-connected with center shaft 15 are separately delivered to an assembly plant for vehicle seat, and center shaft 15 is press-connected to cam 9 of seat reclining device 1 in a seat assembly process in the assembly plant; all that is needed to do in the assembly plant is only the press-fit working of center shaft 15 because of the above-mentioned guarantee of centering. That is, seat reclining device 1 can be transported under a compact condition where center shaft 15 has not yet mounted in seat reclining device 1, so that the transportation cost can be considerably reduced.

According to the structure of first embodiment, cam 9 having axially projecting portions 13a is obtained by separately forming axially projecting member 13 and cam 9 and then by combining axially projecting member 13 with cam 9. Therefore, a cam having complex shape such as cam 9 having axially projecting portion 13a formed with notch portions 13d can be easily manufactured.

Second Embodiment

Next, a second embodiment according to the present invention will now be explained. Explanations about structural parts similar as the first embodiment will be omitted for the purpose of simplification of the disclosure, and only structural parts different from the first embodiment will be explained below.

Figure 6B:
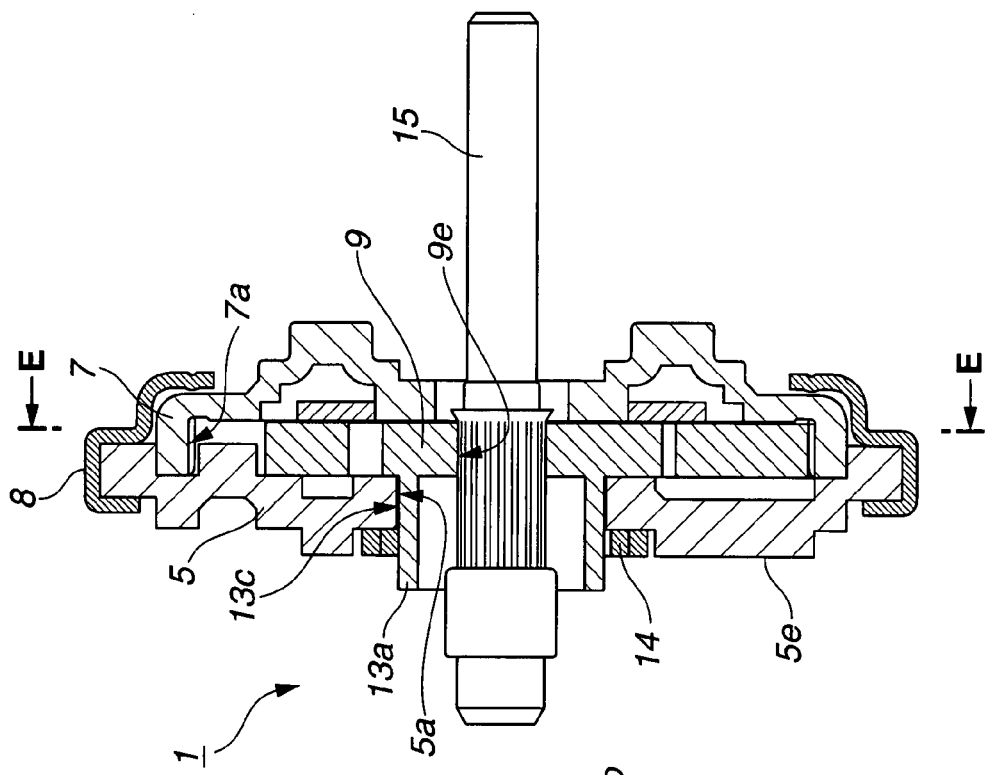
FIG. 6B is a sectional view of FIG. 6A as viewed in a direction shown by arrows D.
Figure 6A:
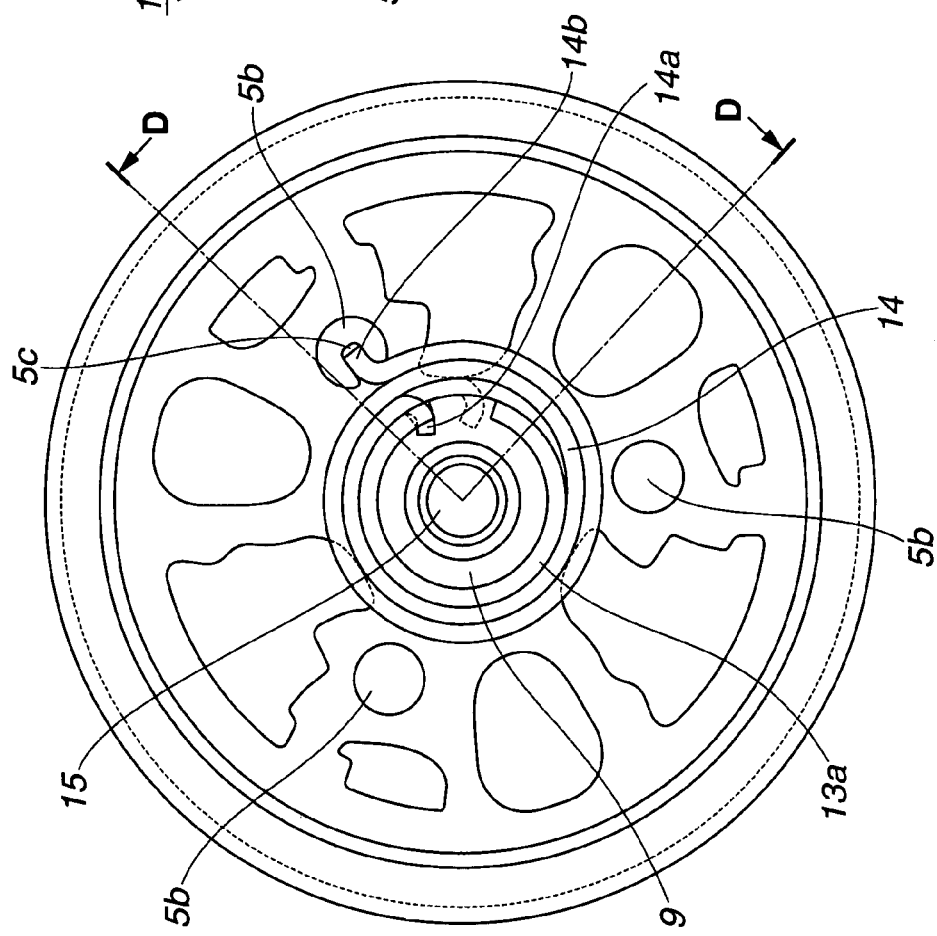
FIG. 6A is a front view of a seat reclining device for vehicle according to a second embodiment of the present invention.
Figure 7:
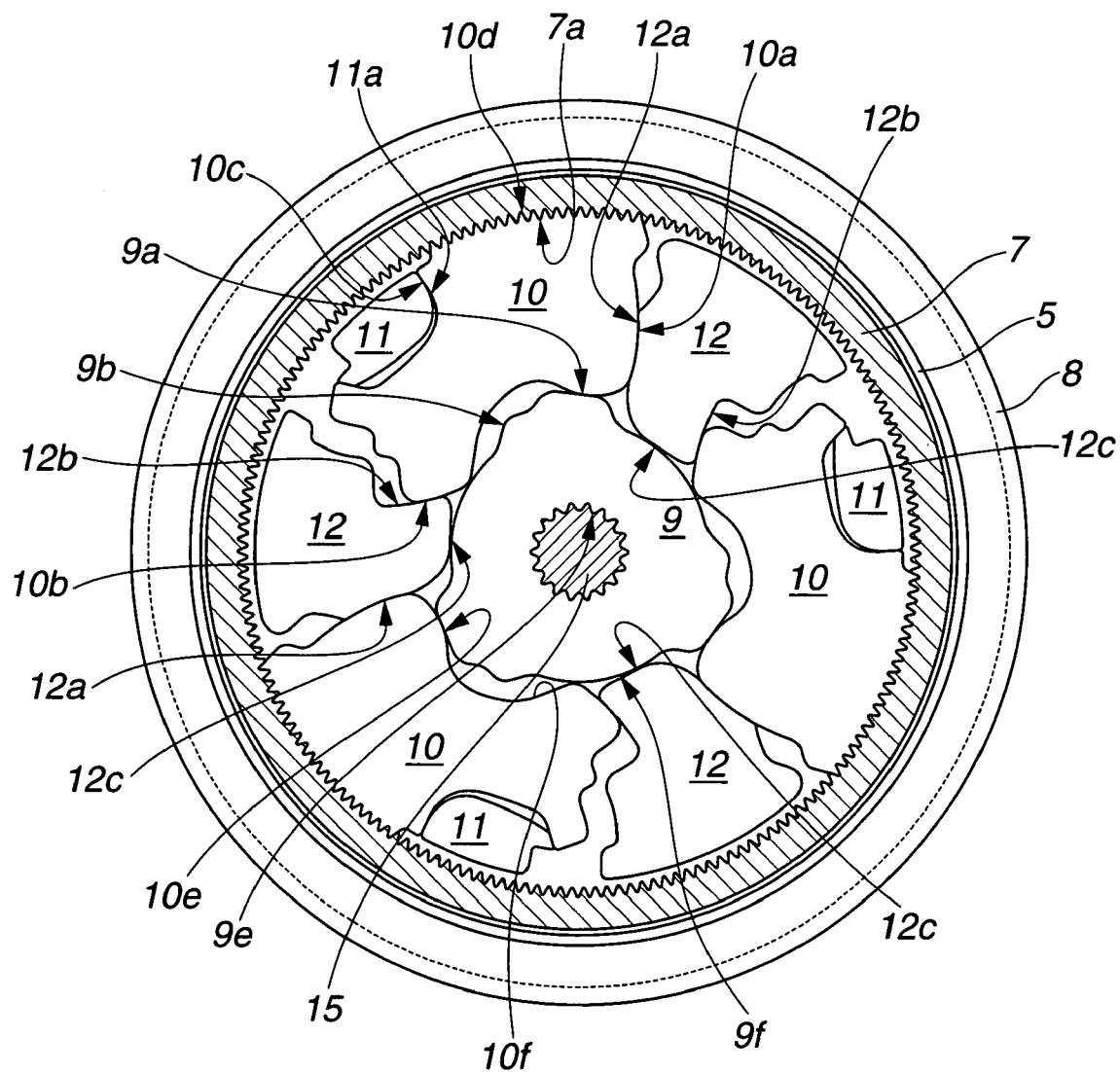
FIG. 7 is a sectional view of FIG. 6B as viewed in a direction shown by arrows E in the second embodiment.

As shown in FIGS. 6 and 7, in this second embodiment, axially projecting portion 13a is moulded integrally with cam 9 by means of plastic forming (deformation processing) such as sinter forming or forging.

As shown in FIGS. 8A to 8C, axially projecting portion 13a is shaped almost like a tube, and is formed with a slit 13e at one position in its circumferential direction. Namely, axially projecting portion 13a has slit 13e extending in the axial direction so as to give a C-shaped cross section as viewed in the axial direction. Axially projecting portion 13a is formed with two notch portions 13d at circumferentially both sides of slit 13e. Inner end portion 14a of lock spring 14 which has been bent is hung at notch portion 13d.

Next, only operations different from the first embodiment will be now explained.

According to the structure of second embodiment, cam 9 having axially projecting portion 13a is obtained by moulding axially projecting portion 13a integrally with cam 9. Therefore, axially projecting portion 13a can be formed substantially in a tubular (cylindrical) shape, and thereby the inclination of axially projecting portion 13a and the inclination of center shaft 15 can be further reduced. Moreover, by virtue of such an integral moulding, a high accuracy of dimension and a reduced number of components can be achieved.

Third Embodiment

Next, a third embodiment according to the present invention will be now explained. In the third embodiment, axially projecting portion 13a is moulded integrally with cam 9 in the similar manner as the second embodiment. However in the third embodiment, the moulding method is a plastic forming by way of forging. Hence, only structures different from the second embodiment will be explained below for the purpose of simplification of the disclosure.

In the case where cam 9 has been integrally moulded with axially projecting portion 13a, a great force tends to be applied to axially projecting portion 13a since cam 9 is apart from the lock spring 14's hanging position (i.e., notch portion 13d) of axially projecting portion 13a. Therefore, in the third embodiment, cam 9 and axially projecting portion 13a are integrally moulded by means of forging. This is because the forging can cause cam 9 and axially projecting portion 13a to enhance their resistances to impact shock, and additionally can reduce a cost of manufacturing.

Figure 9B:
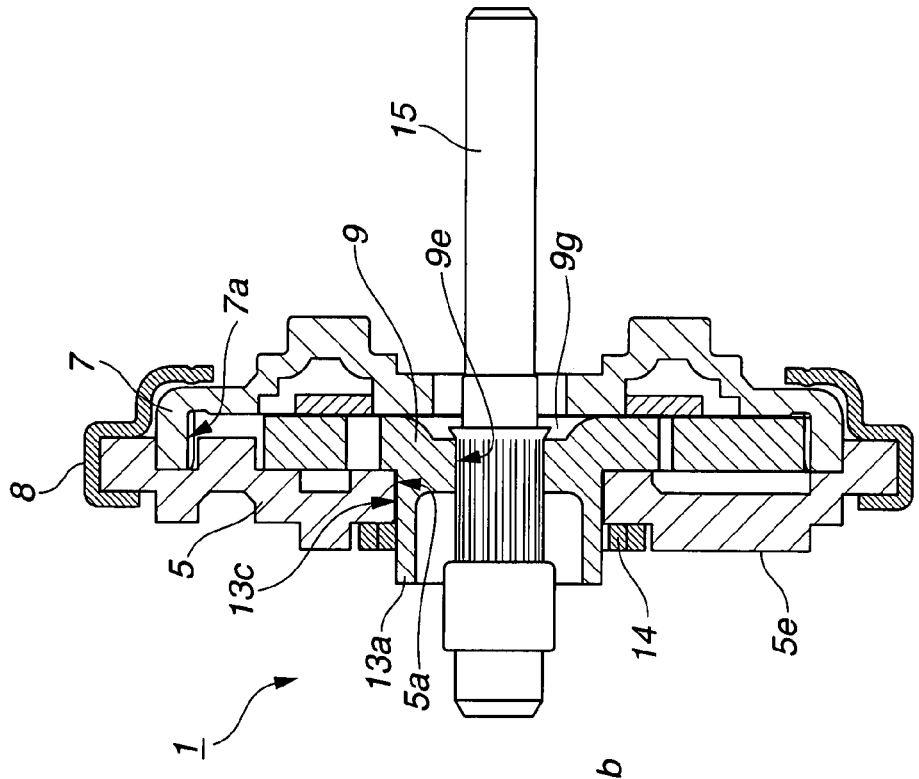
FIG. 9B is a sectional view of FIG. 9A as viewed in a direction shown by arrows G.
Figure 9A:
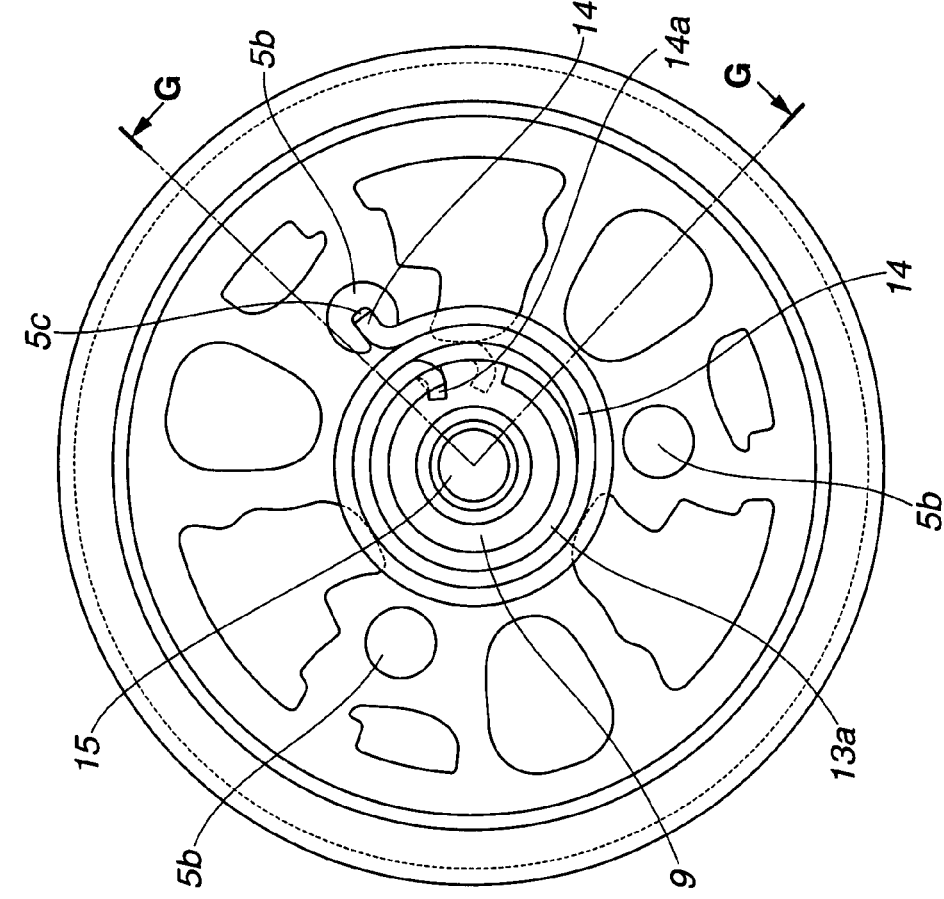
FIG. 9A is a front view of a seat reclining device for vehicle according to a third embodiment of the present invention.

FIG. 9A is a front view of seat reclining device 1 in which cam 9 has been moulded integrally with axially projecting portion 13a by means of forging. FIG. 9B is a cross sectional view of FIG. 9A as viewed in a direction shown by arrows G. As can be seen by comparing FIG. 9B with FIG. 6B indicating the case where cam 9 and axially projecting portion 13a are formed by means of sinter forming, cam 9 is formed with a (axially) depressed portion 9g near the inner peripheral surface of cam 9 and on the axially opposite side of axially projecting portion 13a in FIG. 9B. Namely, depressed portion 9g is provided in the radially inner portion of cam 9; since axially projecting portion 13a is formed in one axial direction from a portion for providing center hole 9e, and then cam 9 is formed in another axial direction and in the radially outer direction. By performing the forging in such a method, a manufacturing workability is improved.

Seat reclining device 1 according to the third embodiment has a high resistance to impact shock (has a high strength) and can reduce the cost of manufacturing, since cam 9 is formed integrally with axially projecting portion 13a by means of forging.

In the first embodiment, there has been shown the example that two axially projecting portions are provided. However, three axially projecting portions may be provided in the first embodiment. Further, in the second and third embodiments, axially projecting portion formed with a slit at one position on its circumference is provided as a nearly-tubular axially projecting portion. However, a completely-tubular axially projecting portion formed with a hole as the spring hanging portion may be provided in the second and third embodiments. Furthermore, even in the case where axially projecting portion 13a is moulded integrally with cam 9 as in the second and third embodiments, two or three axially projecting portions may be arranged at substantially even intervals in the circumferential direction as in the first embodiment.

This application is based on prior Japanese Patent Applications No. 2006-319448 filed on Nov. 28, 2006 and No. 2007-43101 filed on Feb. 23, 2007. The entire contents of these Japanese Patent Applications are hereby incorporated by reference.

Although the invention has been described above with reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A seat reclining device for a vehicle, comprising:
   a base member connected with either one of a seat cushion and a seat back arranged rotatably to the seat cushion, the base member being formed with a shaft hole;
   a rotating member connected with another of the seat cushion and the seat back and arranged circumferentially rotatably to the base member, the rotating member including an internal gear in an inner peripheral surface of the rotating member;
   at least three lock members each including an external gear adapted to engage with the internal gear, each of the at least three lock members being adapted to swing in a direction in which the external gear engages with or disengages from the internal gear;

a shaft portion formed integrally with the base member, the shaft portion including a convex guiding surface for swinging the at least three lock members along a circular orbit;

a cam adapted to lock and unlock the rotating member by pressing the at least three lock members and thereby engaging or disengaging the external gear with/from the internal gear, the cam being provided with an axially projecting portion projecting in an axial direction of the cam and passing through the shaft hole, the axially projecting portion including a centering outer peripheral surface which is slidably in contact with an inner peripheral surface of the shaft hole;

a center shaft press-fitted into the cam to pass through the cam, and adapted to rotate the cam, the center shaft passing through the shaft hole;

a biasing member disposed so as to surround the center shaft and biasing the cam in a direction for locking the rotating member, the biasing member including an inner end portion connected with a tip portion of the axially projecting portion and an outer end portion connected with the base member;

an operating lever attached to the center shaft; and at least three guide projections formed integrally with the base member, the at least three guide projections and the at least three lock members being disposed alternately in a circumferential direction relative to a rotation axis of the cam, each of the at least three guide projections including a centering inner peripheral surface provided at an inner peripheral side of the each of the at least three guide projections relative to the rotation axis, and adapted to slide on an outer peripheral surface of the cam to perform a centering of the cam and a pair of concave guiding surfaces respectively guiding the adjacent two of the at least three lock members so as to swing the adjacent two of the at least three lock members along the circular orbits.

2. The seat reclining device as claimed in claim 1, wherein the cam is provided with a plurality of axially projecting portions substantially at even intervals in the circumferential direction, and base end portions of the plurality of axially projecting portions are formed integrally with a ring-shaped linking portion to define an axially projecting member;

the cam is formed with a plurality of arc-shaped holes; and each of the plurality of axially projecting portions is connected with the cam so as to be inserted into a corresponding plurality of arc-shaped holes by press fitting.

3. The seat reclining device as claimed in claim 1, wherein the cam is provided with a plurality of axially projecting portions substantially at even intervals in the circumferential direction, and the cam is moulded integrally with the plurality of axially projecting portions.

4. The seat reclining device as claimed in claim 1, wherein the axially projecting portion is substantially in the form of a tube, and the cam is moulded integrally with the axially projecting portion.

* * * * *